May 22, 1956
R. H. HOBROCK
2,746,141
METHOD OF WELDING A TUBE
Filed Nov. 27, 1950
2 Sheets-Sheet 1
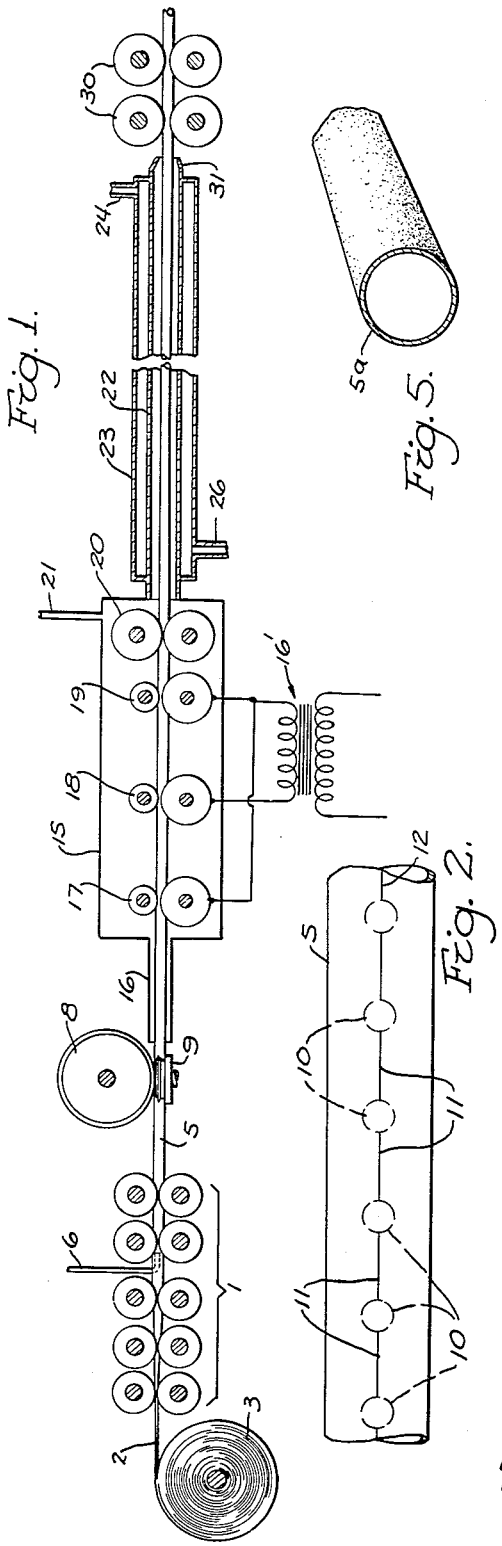
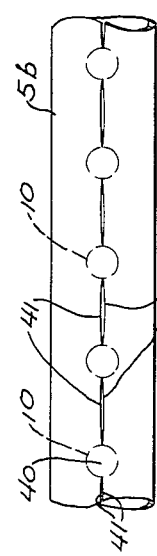
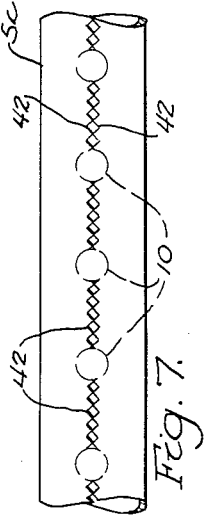
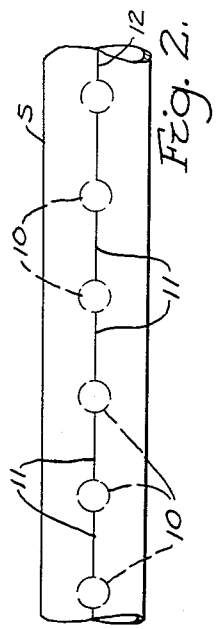
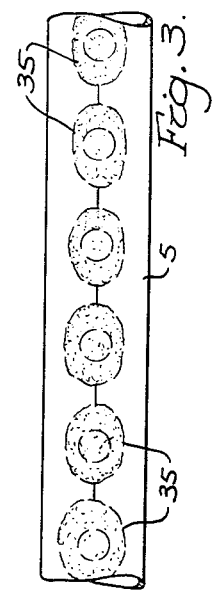
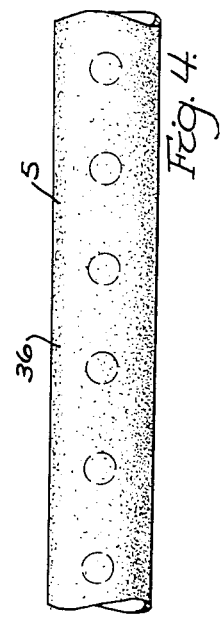
INVENTOR.
Raymond H. Hobrock
BY
Barnes, Kisselle, Laughlin & Raisch
Attorneys.

United States Patent Office 2,746,141
Patented May 22, 1956

2,746,141

METHOD OF WELDING A TUBE

Raymond H. Hobrock, Birmingham, Mich., assignor to Bundy Tubing Company, Detroit, Mich., a corporation of Michigan Application November 27, 1950, Serial No. 197,797

5 Claims. (Cl. 29—473.5)

This invention relates to a method of making welded tube and to the product thereof, and it has to do especially with a method wherein a strip of metal stock is fashioned into tubular form with the edges of metal stock disposed in abutting relationship and the stock and welding means are moved relative to each other so that the welding means traverses the seam formed by the abutting edges. Usually, the stock moves while the welding means remains in a fixed position.

The invention is believed to be particularly applicable to the making of tube of relatively small diameter although not necessarily limited thereto. Such a tube, for example, may be one having an outside diameter of about 5/8" fashioned from longitudinally moving strip steel stock having a thickness in its vicinity of .035 inch.

Many difficulties are encountered in the making of small diameter butt welded tube which are not present, at least to the same degree, in the making of the larger sizes of welded tube or pipe. Among these difficulties are the holding of the edges, which may be relatively thin, in proper abutting alignment preparatory to welding them together, minimizing metal upset at the weld which forms a burr on the inside or outside of the tube or both and the obtaining of uniformity along the length of the welded seam and uniformity of the crystal structure of the metal in the vicinity of the seam.

In accordance with the invention the edges of the tubular steel strip stock are brought into abutting relationship and the edges are then tack welded together. This is preferably done by electric welding and the locations of the tacks or spots are spaced from each other leaving unwelded interfaces between the tacks. The edges are thus held accurately relative to each other. Subsequently, the metal in the vicinity of the seam is heated to a temperature at which a weld can be made quickly in conjunction with plastic deformation to cause recrystallization. The tack welds are not destroyed in this heating of the metal and serve as centers of recrystallization. The crystal growth spreads in all directions from the growth centers and the tacks are so spaced that the crystal growth bridges the space from one tack to another and grows across the interfaces so that the previously unwelded interfaces are welded together.

The invention is disclosed in the accompanying drawings:

Fig. 1 diagrammatically illustrates an apparatus for making tubing from longitudinally moving strip stock.

Fig. 2 is a view demonstrating the tube as it appears after the completion of the tack welds.

Fig. 3 is a view illustrating the tube after plastic deformation and showing the crystal growth partially completed.

Fig. 4 is a view illustrating the complete recrystallization.

Fig. 5 is a cross-sectional view of the welded tube.

Fig. 6 is a view similar to Fig. 2 illustrating a modified arrangement.

Fig. 7 is a view similar to Fig. 6 illustrating further a modified arrangement.

Figure 8:
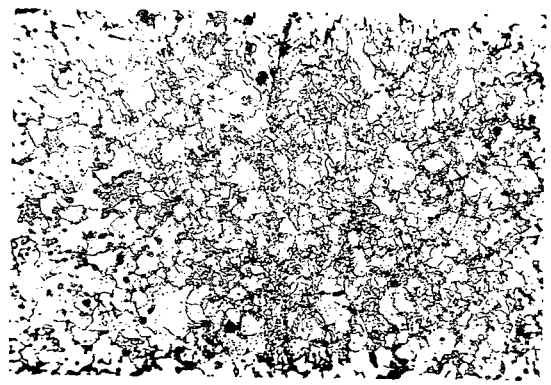
Fig. 8 is a view illustrating the structure of low carbon steel stock at the interfaces between the welded tacks and before the interfaces are welded together.

One form of apparatus which can be employed is illustrated in Fig. 1. It embodies a suitable tube forming mill which comprises a number of forming rollers, generally illustrated at 1, which draws strip stock 2 from a coil 3 and fashions it into tube form as shown at 5. Before the seam of the tube is closed a non-oxidizing or reducing gas is introduced into the tube through a pipe 6, the purpose of which is to clean the surfaces and eliminate or minimize oxides and the formation thereof.

Downstream from the forming mill are electrical resistance welding electrodes in the form of rotary electrodes 8. The electrodes engage the tube on opposite sides of the seam with pressure and the tube is backed up by pressure resisting rollers 9. Alternating current is preferably employed for the electrodes 8 and these electrodes tack weld the edges together, as shown in Fig. 2. As illustrated in Fig. 2 the tack welded portions or spots are indicated by the broken lines 10 and the abutting interfaces of the edges between the spots are indicated at 11. These interfaces are, of course, not welded but the entire seam, which is generally illustrated at 12, is accurately formed by an accurate relative positioning of the abutting edges. The interfaces are held abutted against each other. The frequency of the alternating current and the speed of movement of the stock are co-related so that the tack welds are spaced apart in a proper relationship as will later appear. It will be seen that the higher the frequency the faster the stock may be moved for a given spatial condition.

Downstream from the tack welding electrodes is means for heating the metal in the vicinity of the seam and for completing the welding of the seam. This is shown as being in the form of an electrical resistance heating device and comprises a housing 15 with an inlet 16 into which the tack welded tube passes. Within the housing are suitable electrodes, preferably in the form of rollers, each of which has a backing roller as shown. A transformer 16' has one side thereof connected to the center electrode 18 and the other side thereof is connected to the forward electrode 17 and to the rearward electrode 19. With this arrangement, the electric current is passed lengthwise through the tubing so that the entire tube is substantially uniformly heated.

Just downstream from the electrodes and preferably within the housing are means for causing a plastic deformation and this means is shown as being in the form of a pair of reducing rolls 20 which engage the tube and impart a squeezing or reducing action thereon. Only one pair of reducing rolls are shown and it is, of course, within the invention to use any suitable number of reducing rolls. A suitable non-oxidizing or reducing gas is preferably introduced into the housing 15. The same may enter through a pipe 21 and the gas may escape and burn off at the entrance end 16 of the furnace.

Downstream from the furnace is a cooler into which the tube passes. The cooler shown is of a water jacketed type having an inside pipe 22 through which the tube passes and an outer jacket 23. Cooling water may be introduced through the pipe 24 and may discharge from a pipe 26. Downstream from the cooler are suitable pulling and sizing rolls generally illustrated at 30. The gas entering the furnace may burn off at the entrance end 16. To facilitate this, the outlet end of the cooler may be constricted as shown at 31 and then, too, the cooler has considerable length so that the inlet end of the housing is nearer the gas inlet than the outlet end of the cooler and the gas tends to flow in the direction of least resistance.

As previously indicated, the tack welding serves not only to bring the interfaces into intimate contact and in the desired accurate position, but the recurring and spatially distributed welded spots act as centers from which, at the high temperature and with the necessary condition of plastic deformation, the phenomenon of recrystallization causes a growth of new grains across the intimately located but yet unwelded interfaces. The partially completed seam in the condition shown in Fig. 2 is, of course, a poor seam in that it is not liquid tight and not completely welded.

Recrystallization is the growth of new crystals in solids at temperatures below the melting point. For recrystallization to occur, two conditions must be satisfied: (1) a condition of instability must exist or occur within the solid and, (2) a proper threshold temperature must be reached or exceeded. A condition of instability may exist in a solid due to (a) residual stresses, and (b) concentration gradients of alloying materials or possibly of impurities. A condition of instability may occur in a solid due to (c) stresses resulting from non-uniform thermal expansion (d) a change of crystal form of allotropic substances and (e) the application of external deforming forces.

Iron is an allotropic substance with the various modifications being stable within certain temperature ranges as follows:

| Modification | Crystal Structure | Range of Stability, °C. |
|---|---|---|
| Alpha | Body-centered Cubic | 910° and below. |
| Gamma | Face-centered Cubic | 910° to 1,400°. |
| Delta | Body-centered Cubic | 1,400° to 1,535°. |

Ferrous alloys have their stability ranges modified, and in some cases of highly alloyed ferrous metals may be completely or substantially suppressed. For purposes of this disclosure, iron will be considered although low carbon steel is not greatly different except for variations in the temperature of stability. Thus it appears that iron theoretically can be completely recrystallized and grow across an interface and form a weld without the necessity of a plastic deformation. This is not likely to occur to any great extent at the modification change from alpha to gamma at 910° C. because the rate of recrystallization is low due to the low mobility of the atoms of iron at this temperature, and due also to the low mobility and lack of tendency to coalesce and draw together of the impurities and gas inclusions which will be found at the original interface.

Obviously, such gas inclusions and other impurities must draw together and coalesce as the new crystals grow across the interface; otherwise a plane of weakness will exist at the original interface (the seam).

However, if the intimate interfaces are heated to a temperature beyond the next allotropic change (gamma to delta at 1400° C.), then during such allotropic change recrystallization will occur and a weld may be formed without plastic deformation.

Thus it is theoretically possible by a proper heat treatment alone to cause crystals to grow across an interface and thus eradicate the interface, or that is, form a weld.

However, there are on the surfaces, films of oxides, nitrides, absorbed gases, etc., which constitute a barrier to the growth of crystals below the melting point. Such recrystallization depends upon the dynamics of atoms within spatial limitations of the order of the interatomic distances within the crystal. With no assistance other than the vibrational energy of the atoms at the elevated temperatures, augmented by the energy of the transformation at the allotropic change, small barriers, such as those occasioned by impurities may greatly hamper the recrystallization. If at some point or points and by some means, the growth of crystals has been started across the interfaces and the interfaces are in intimate contact (except for thin layers of impurities or foreign atoms), then by continued application of high temperatures and/or by repeated temperature oscillations through the allotropic change temperature, the impurities can be caused to coalesce and the growth of crystals will advance. Obviously, in a commercial process to operate at high speed such alliance is not practical. Furthermore, many metals do not undergo allotropic changes or they undergo allotropic changes at such low temperatures that the overall vibrational energy of the atoms is too low for any considerable reshaping or growth of the crystals beyond its original boundaries.

In accordance with the present invention, the metal to be welded is subjected to plastic deformation after the metals have been heated to a recrystallization temperature. The plastic deformation accelerates the recrystallizing function and further helps to break through such barriers as oxides, nitrides, absorbed gases, etc.

Accordingly, the stitch or tack welds hold the abutting edges in accurate position and breaks through oxides, absorbed gases, dirt, etc. between the abutting faces and establishes centers from which subsequent recrystallization can proceed at a proper temperature and with a plastic deformation in order to complete the joining of the interfaces at the seam. The tack welds are so spaced from each other that the recrystallization growth extends completely from one tack to another. The tacks or spots may be spaced on the basis of three or four per inch. The temperature to which the tubing is subjected is in the gamma range. It has been found that a satisfactory temperature to which the tube is subjected in the furnace is about 2400° F. (1315° C.). While at about this temperature, the reduction rolls 20 engage the tube with pressure and cause plastic deformation and a grain growth will occur which will proceed from the previously established growth centers, that is, the tack welded spots and proceed in all directions. Such growth of crystals is very rapid and is difficult to interrupt except when some impurities of some sort act as barriers to the growth. In Fig. 2, for example, the broken lines 10 indicate the tack welds. In Fig. 3 the dotted areas 35 indicate the crystal growth as partially completed whereas in Fig. 4 the entire dotted area 36 indicates the recrystallization complete. The crystals have grown across the original unwelded interfaces and, therefore, the interfaces no longer exist as they are joined or welded. The broken lines representing the original centers of recrystallization are indicated in Figs. 3 and 4 but these actual tack welds are obliterated in the final product.

If the tube is uniformly heated throughout its circumference, the plastic deformation will tend to be uniformly distributed throughout the circumference, and recrystallization will occur throughout the circumference. This, in itself, is not harmful to the tube provided that sufficient plastic deformation be made so that recrystallization results in small crystals and a high degree of isotropy be achieved in the finished material.

If the tube is uniformly heated, the deformation will be substantially uniformly distributed throughout the circumference of the tube. Basically, however, the plastic deformation is required only in the immediate vicinity of the weld. If the metal is heated and plastically deformed only in the vicinity of the weld, then most all of the diameter reduction of the tube can be concentrated in the region of the seam. Such a welding process may be carried out by heating the tube more or less locally along the seam.

In some cases, as, for example, with a small thin walled tubing, the tubing is quite soft and fragile when heated throughout its circumference to the high temperature desirable for recrystallization. And a large deformation in one pass may be difficult to make without danger to the formed tube. In such a case, it may be desirable to accomplish a preferential or localized deformation at and in the immediate vicinity of the seam. One way of accomplishing this is illustrated in Fig. 6. Here the tube 5b has its edges somewhat of scalloped formation. The figure shows the arrangement in exaggerated form. The edges have portions 40 which are brought into abutting relationship and tack welded together. The intervening portions, due to the scalloped formation provide surfaces 41 which face each other in spaced relationship. When this tube is heated and subjected to compressive forces, a relatively large plastic deformation occurs in the region of the tack spots and will result in good local recrystallization. The plastic deformation is such that the open areas are closed and the faces brought into contact with each other and the small tack areas act as centers from which recrystallization starts and which proceeds in all directions and across the faces 41 which are brought together and welded.

Another variation is illustrated in Fig. 7 where the abutting edges are formed with small irregularities or serrations as generally indicated at 42. These edges are tack welded as aforesaid, as indicated at 10, and the deformation, upon completion, is more heavily localized as the projections or serrations are deformed and more or less flattened. The tack spots serve as aforesaid, as centers of recrystallization in the welding of the entire seam. This arrangement, as shown in Fig. 7, however, may result in a thickening of the metal at the seam.

The reducing or non-oxidizing atmosphere maintained both within and outside of the tubing facilitates the reduction of and prevents the formation of oxides which would hamper the recrystallization across the interfaces. As stated above, such atmosphere moves into the cooler and serves to prevent oxidation during the cooling of the tubing.

Figure 9:
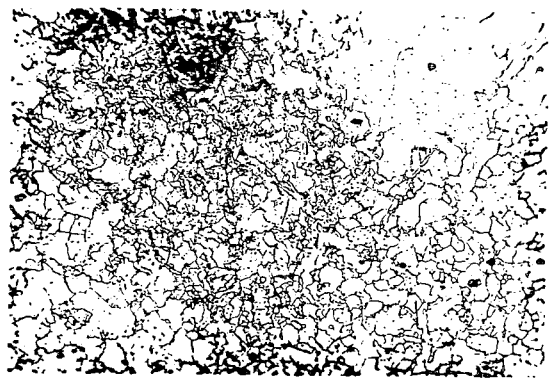
Fig. 9 is a view similar to Fig. 8 showing the structure at the interfaces after annealing but before welding.
Figure 10:
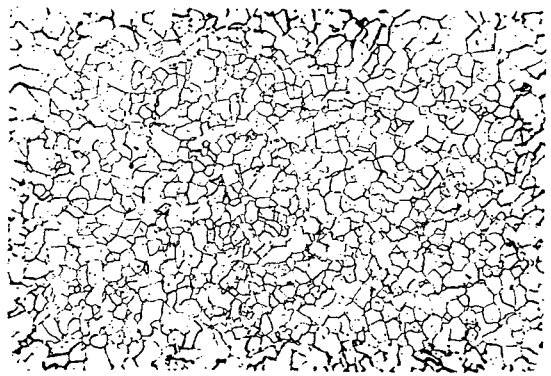
Fig. 10 is a view similar to Figs. 8 and 9 showing the crystal structure at the interfaces between the tacks after welding and illustrating the lack of all evidence of the original interfaces.

To further exemplify the invention, Figs. 8, 9, and 10 may be considered, these being reproductions of photomicrographs at 100 diameters showing the grain structure. The line of separation of the interfaces is demonstrated in Fig. 8 where a clear cleavage of the crystal structure is shown. This illustrates the abutted interfaces of the intervals between the tack welds before welding and heat treating. In Fig. 9 the same interfaces are shown before welding and after heat treating or annealing at about 1500° F. and the line of separation at the interfaces is definitely indicated by the crystal structure. However, the same location of the interfaces are shown in Fig. 10 after welding and following an annealing at about 2100° F. It will be observed that structural differentiation at the seam area has disappeared as well as all evidence of the original interfaces.

I claim:

1. The method of making tube from strip steel stock which comprises, moving the strip lengthwise, fashioning the strip into tubular form with opposite edges of the strip disposed in abutting relationship, tack welding the abutting edges together by electrical resistance at spots which are spaced lengthwise of the tube thereby leaving portions with unwelded interfaces between the welded spots, passing the tube through a heating zone and therein heating the entire tube to a temperature in the vicinity of 2400° F., and while the tube is so heated, subjecting the tube to pressure to effect plastic deformation of the metal and to force the interfaces together, to thereby cause recrystallization with the welded spots serving as centers from which recrystallization initiates and grows, and spacing the welded spots from each other so that there are about three or four spots to the inch so that the recrystallization growth extends completely from one spot to another and across the interfaces to thereby weld unite the interfaces and provide a substantially uniformly welded seam.

2. The method of making tube from strip steel stock which comprises, moving the strip lengthwise, fashioning the strip into tubular form with opposite edges of the strip disposed in abutting relationship, tack welding the abutting edges together by electrical resistance at spots which are spaced lengthwise of the tube thereby leaving portions with unwelded interfaces between the welded spots, passing the tube through a heating zone and therein heating the metal, at least in the vicinity of the abutting edges, to a temperature which is adequate for pressure welding the steel stock in the range from 910° C. to 1400° C., and while so heated subjecting the heated metal to pressure to effect plastic deformation thereof and to force the interfaces together, to thereby cause recrystallization with the welded spots serving as centers from which recrystallization initiates and grows, and spacing the welded sports from each other so that there are about three or four spots to the inch so that the recrystallization growth extends completely from one spot to another and across the interfaces to thereby weld unite the interfaces and provide a substantially uniformly welded seam.

3. The method of making tube from strip steel stock which comprises, moving the strip lengthwise, fashioning the strip into tubular form with opposite edges of the strip disposed in abutting relationship, tack welding the abutting edges together by electrical resistance at spots which are spaced lengthwise of the tube thereby leaving portions with unwelded interfaces between the welded spots, passing the tube through a heating zone in a non-oxidizing atmosphere and therein heating the metal, at least in the vicinity of the abutting edges, to a temperature which is adequate for pressure welding the steel stock in the range from 910° C. to 1400° C., and while so heated and in said atmosphere, subjecting the heated metal to pressure to effect plastic deformation thereof and to force the interfaces together, to thereby cause recrystallization with the welded spots serving as centers from which recrystallization initiates and grows, and spacing the welded spots sufficiently cose to each other that the recrystallization growth extends completely from one spot to another and across the interfaces to thereby weld unite the interfaces and provide a substantially uniformly welded seam.

4. The method of making tube from strip metal stock which comprises, moving the strip lengthwise, fashioning the strip into tubular form with opposite edges of the strip disposed in abutting relationship, tack welding the abutting edges together at spots which are spaced lengthwise of the tube thereby leaving portions with unwelded interfaces between the welded spots, heating the metal at least in the vicinity of the abutting edges to a temperature which is adequate for pressure welding the metal in the range from 910° C. to 1400° C., and while the metal is so heated, subjecting the same to pressure to effect plastic deformation thereof and to force the interfaces together, to thereby cause recrystallization with the welded spot serving as centers from which recrystallization initiates and grows, and spacing the welded spots from each other so that there are about three or four spots to the inch so that the recrystallization growth extends completely from one spot to another and across the interfaces to thereby weld unite the interfaces and provide a substantially uniformly welded seam.

5. The method of making tube from strip steel stock which comprises, moving the strip lengthwise, fashioning the strip into tubular form with opposite edges of the strip disposed in abutting relationship, tack welding the abutting edge together by electrical resistance at spots which are spaced lengthwise of the tube thereby leaving portions with unwelded interfaces between the welded spots, passing the tube through a heating zone and therein heating the metal, at least in the vicinity of the abutting edges, to a temperature which is adequate for pressure welding the steel stock in the range from 910° C. to 1400° C., and while so heated, subjecting the heated metal to pressure to effect plastic deformation thereof and to force the interfaces together, to thereby cause recrystallization with the welded spots serving as centers from which recrystallization initiates and grows, and spacing the welded spots sufficiently close to each other that the recrystallization growth extends completely from one spot to another and across the interfaces to thereby weld unite the interfaces and provide a substantially uniformly welded seam.

References Cited in the file of this patent

UNITED STATES PATENTS

| | | |
|---|---|---|
| 1,506,532 | Kjekstad | Aug. 26, 1924 |
| 1,661,970 | Sessions | Mar. 6, 1928 |
| 1,712,507 | Lanson | May 14, 1929 |
| 1,740,033 | Pickney | Dec. 17, 1929 |
| 1,767,220 | Malm | June 24, 1930 |
| 1,872,276 | Graham | Aug. 16, 1932 |
| 1,893,926 | Anderson | Jan. 10, 1933 |
| 1,984,300 | Cornell | Dec. 11, 1934 |
| 2,024,485 | Sussman | Dec. 17, 1935 |
| 2,156,952 | Morsing | May 2, 1939 |
| 2,197,962 | Anderson | Apr. 23, 1940 |
| 2,329,938 | Ortiz | Sept. 21, 1943 |
| 2,380,107 | Hobrock | July 10, 1947 |

OTHER REFERENCES

Metals Handbook, 1948 edition, pages 11 and 259, published by American Society for Metals, 7301 Euclid Avenue, Cleveland, Ohio.